United States Patent [19]
Courtright et al.

[11] Patent Number: 5,644,788
[45] Date of Patent: Jul. 1, 1997

[54] BURST TRANSFERS USING AN ASCENDING OR DESCENDING ONLY BURST ORDERING

[75] Inventors: David A. Courtright, Richardson; Douglas Ewing Duschatko, Plano, both of Tex.

[73] Assignee: Cyrix Corporation, Richardson, Tex.

[21] Appl. No.: 330,402

[22] Filed: Oct. 28, 1994

[51] Int. Cl.$^6$ .................................................. G06F 13/28
[52] U.S. Cl. ............................ 395/855; 395/445; 395/309
[58] Field of Search ........................................ 395/306, 307, 395/308, 309, 310, 855, 849, 853, 445

[56] References Cited

U.S. PATENT DOCUMENTS

| | | | |
|---|---|---|---|
| 5,131,083 | 7/1992 | Crawford et al. | 395/849 |
| 5,134,699 | 7/1992 | Aria et al. | 395/855 |
| 5,255,378 | 10/1993 | Crawford et al. | 395/307 |
| 5,276,684 | 1/1994 | Pearson | 370/94.1 |
| 5,469,577 | 11/1995 | Eng et al. | 395/290 |

*Primary Examiner*—Glenn A. Auve
*Attorney, Agent, or Firm*—Andrew S. Viger; John L. Maxin

[57] ABSTRACT

Burst ordering logic is used, in an exemplary embodiment, to implement an ascending only burst ordering for cache line fills in 486 computer systems while maintaining compatibility with the conventional 486 burst ordering which uses both ascending and descending burst orders depending upon the position of the requested address (critical Dword) within a cache line (conventional 486 burst ordering is illustrated in Table 1 in the Background). The burst ordering logic (60) implements a 1+4 burst ordering for requested addresses that, for conventional 486 burst ordering, would result in a descending burst order (the exemplary 1+4 burst ordering is illustrated in Table 2 in the Specification). The burst ordering logic includes request modification circuitry (64), address modification circuitry (66), and cacheability modification circuitry (68). If the burst ordering logic detects a cacheable requested address that will cause a cache line fill using an ascending burst order, that requested address is passed through to the bus interface unit for servicing as a normal cache line fill. If, however, the requested address would result in a descending burst order, the cacheability modification circuit modifies cacheability to cause the microprocessor to assert PCD (page cache disable), signaling to the system logic that the requested address is noncacheable—the system logic responds with a single non-burst transfer (1+) of the requested address. The request modification circuitry then signals a burst transfer request for a cache line fill, and the address modification circuitry modifies the requested address to provide a bus cycle address that is within the cache line that contains the requested address but will result in an ascending burst order to transfer that cache line (+4).

6 Claims, 4 Drawing Sheets

BURST TRANSFERS USING AN ASCENDING OR DESCENDING ONLY BURST ORDERING

BACKGROUND

1. Technical Field

The invention relates generally to information processing system organizations (Class 395), and more particularly to system interconnections, I/O processing, and storage accessing and control (subclasses 325, 275, and 425).

In even greater particularity, the invention relates to the burst ordering scheme for burst transfers of data from a memory subsystem to a processor. In an exemplary embodiment, the invention is used in a computer system based on a 32-bit 486-class microprocessor/bus architecture in which a cacheable read results in a burst transfer of an entire cache line of 4 Dwords (32-bit doublewords) in four successive bus cycles.

2. Related Art

Computer systems based on the 486-class microprocessor ("486 computer systems") typically use a burst mode bus architecture. Burst transfers are used to transfer multiple blocks of data (such as multiple Dwords) from a memory subsystem to a processor over an external bus with a width less than the total size of the transfer (such as a single Dword)—the multiple blocks are transferred in a burst sequence using successive bus is cycles.

Without limiting the scope of the invention, this background information is provided in the context of a specific problem to which the invention has application: in a 486 computer system, implementing a burst transfer protocol that uses a burst order (sequence) of ascending or descending (modulo 4) addresses only, while maintaining compatibility with the conventional 486 bus architecture and in particular the 486 burst ordering scheme. The 486-class microprocessor processes data in 32-bit Dwords (4-bytes), and includes an internal cache organized in cache lines of 4-Dwords (16 byte). Reads that miss in the cache result in the transfer of the entire cache line that includes the requested Dword. This cache line fill is accomplished in a burst transfer of all 4 Dwords of the cache line initiated by a single address strobe—the 4 Dwords are transferred in a predetermined order (sequence) in successive bus cycles.

Performance considerations make it desirable to begin a burst transfer with the specific Dword address requested by the microprocessor's CPU core. This "requested" or "critical" Dword can then be supplied directly to the CPU core without continuing to stall the core until the burst transfer is complete (i.e., the transfer of the other three Dwords of the cache line).

The burst ordering scheme commonly used in 486 computer systems (the "486 burst order") is described in two U.S. patents granted to Intel Corporation: U.S. Pat. Nos. 5,131,083 and 5,255,378 both titled "Method of Transferring Burst Data In A Microprocessor". The burst ordering scheme described uses a different Dword sequence—ascending or descending (modulo 4)—depending on the position of the critical Dword in a memory aligned cache line.

In a memory aligned organization, the Dwords of a burst (cache line) are always within the same 16-byte (4 Dword) aligned memory block. Thus, address bits 31–4 are the same for each of the Dwords—address bits 1 and 0 are used for byte addressing within a Dword, while bits 3 and 2 determine Dword addressing within a burst. Address bits 3 and 2 are designated A<3> and A<2>, respectively, or A<3:2> collectively. The four Dwords A<3:2> are designated 0-1-2-3 (or, alternatively, 0-4-8-C hex).

Table 1 shows the 486 burst ordering for each of the 4 possible requested addresses of a 4 Dword cache line. Note that, if A<2> is 0, then the burst order is ascending (modulo 4), while if A<2> is 1, then the burst order is descending (modulo 4).

TABLE 1

| A<3:2> | A<2> | Burst Order | Burst Direction |
|---|---|---|---|
| 0 | 0 | 0-1-2-3 | Ascending |
| 1 | 1 | 1-0-3-2 | Descending |
| 2 | 0 | 2-3-0-1 | Ascending |
| 3 | 1 | 3-2-1-0 | Descending |

A common alternative to the 486 burst ordering scheme is linear wrap. In this ordering scheme, all sequences are either ascending or descending (modulo), regardless of the requested address. Thus, for a 4 Dword burst transfer, an ascending linear wrap burst order sequence would be: 0-1-2-3, 1-2-3-0, 2-3-0-1, and 3-0-1-2.

Using a linear wrap burst ordering scheme in a 486 computer system is problematic because many chipset vendors have taken into account the 486 burst ordering scheme. Thus, to increase burst transfer speeds, the memory subsystem logic may, in response to a burst transfer initiated by a requested address (the critical Dword address), calculate the remaining three addresses according to the 486 burst order sequence and return the data in that order, ignoring any subsequent addresses output by the microprocessor during the burst transfer. Thus, attempting to implement a 486-class microprocessor with a linear wrap burst order would result in an incompatibility with some existing chipset logic.

An alternative scheme for providing linear wrap burst ordering in a 486 computer system would be to cause the microprocessor to initiate a burst transfer using only requested addresses A<3:2>0 or 2 (ascending) or A<3:2>1 or 3 (descending). See, Table 1. Thus, for an ascending-only burst ordering, the microprocessor would initiate a burst transfer for requested addresses A<3:2>0 or 1 with address A<3:2>0, and for requested addresses A<3:2>2 or 3 with address A<3:2>2 (i.e., burst transfers would not be initiated using addresses A<3:2>1 or 3, even if those were the requested addresses).

This scheme would maintain compatibility, but might cause some performance degradation because the critical Dword would not always be returned first. Specifically, for the case of an ascending-only burst ordering, if the requested addresses were A<3:2>1 or 3, the burst transfer would be initiated with addresses A<3:2>0 or 2, with the requested addresses being returned in the second bus cycle of the burst transfer (i.e., 0-1-2-3 and 2-3-0-1).

An addition problem with this alternative approach arises when referencing memory-mapped I/O locations. For certain applications, such as video applications employing destructive reads (where the read causes the memory location to be modified), these I/O locations must be accessed precisely in the order the core requests them. While these I/O locations are non-cacheable, only the external system logic knows that they are non-cacheable. For each request by the microprocessor for a burst transfers, the system logic uses a cache enable (KEN#) signal to notify the microprocessor whether requested data being returned is cacheable—KEN# is returned by the system logic prior to the completion of the transfer of the requested data (i.e., the requested critical Dword that always begins a conventional 486 burst transfer). If in fact the requested data is non-cacheable, the system logic deasserts KEN#, instructing the microprocessor to convert the burst transfer into a single transfer (non-burst) cycle. This signaling protocol requires that the requested address be the first one presented to the system logic—otherwise an extraneous (destructive) read may corrupt a memory-mapped environment.

Thus, implementing a 486-class microprocessor that supports linear wrap burst ordering may result in incompatibility with certain existing chipsets that implement only the 486 burst ordering scheme. Attempting to implement linear wrap by using only the ascending (or descending) sequences of the 486 burst ordering scheme may adversely affect performance, and may cause memory corruption in a memory-mapped environment.

SUMMARY

An object of the invention is to implement a burst ordering technique that uses either an s ascending or descending burst order only.

To accomplish these and other objects, the invention is burst ordering system that implements burst transfers using a selected burst order only, either ascending only or descending only. The burst ordering system is used in a computer system including a processor that generates address requests to retrieve associated Dwords from an internal cache, or if a requested address misses in the cache, from a memory subsystem, which in response to a cacheable address request performs a burst transfer of the corresponding cache line (including the requested Dword) using an ascending burst order if the requested address is of a first type of address, and a descending burst order if the requested address is of a second type of address, where the burst order depends on the cache line location of the requested Dword.

In one aspect of the invention, the burst ordering system includes: (a) burst order detection circuitry, (b) cacheability circuitry, and (c) address generation circuitry. For each cacheable requested address, the burst order detection circuitry detects whether the requested address is of a selected type (either the first type or the second type) such that the corresponding burst transfer would be in the selected burst order.

In response to the detection of a requested address of other than the selected type, the cacheability circuitry causes a non-cacheability signal to be asserted to the memory subsystem along with the requested address, such that the memory subsystem does not respond with a burst transfer, but rather, performs a non-burst transfer of the associated Dword. After this non-burst transfer of the requested Dword, the address generation circuitry causes to be generated a cache-line-transfer address of the selected type (i.e., an address that is in the associated cache line), such that the memory subsystem performs a burst transfer of that cache line including the requested Dword previously transferred.

In an exemplary embodiment, the computer system is a 486 computer system in which a cache line contains four Dwords, such that ascending burst orders are 0-1-2-3 and 2-3-0-1, and descending burst orders are 1-0-3-2 and 3-2-1-0. PCD signaling is used by the burst ordering system, such that PCD is asserted as the non-cacheability signal.

Embodiments of the invention may be implemented to realize one or more of the following technical advantages. The burst ordering technique of the invention permits the use of ascending only or descending only burst ordering, while maintaining compatibility with 486 computer systems that assume a 486 burst ordering. In particular, the 1+4 burst ordering technique ensures that the requested address (critical Dword) is returned first, reducing performance impact, and avoiding memory corruption in a memory-mapped environments.

For a more complete understanding of the invention, and for further features and advantages, reference is now made to the Detailed Description of an exemplary embodiment of the invention, together with the accompanying Drawings, it being understood that the invention encompasses any modifications or alternative embodiments that fall within the scope of the claims.

DETAILED DESCRIPTION

The detailed description of an exemplary embodiment of the burst transfer system is organized as follows:

1. 486 Computer System
    1.1. 486 Bus Interface
    1.2. Burst Transfer Signals
2. Ascending Only Burst Transfers
    2.1. Burst Ordering Circuitry
    2.2. Burst Modification
3. Conclusion This organizational outline, and the corresponding headings, are used in this Detailed Description for convenience of reference only.

The exemplary burst transfer system is used in a 486 computer system based on a 486-class microprocessor, using a conventional 486 burst-mode bus architecture in which cacheable reads result in a burst transfer of an entire cache line of 4 Dwords. Detailed descriptions of conventional or known aspects of microprocessor systems in general, and 486-class microprocessor systems in particular, are omitted so as to not obscure the description of the invention with unnecessary detail. In particular, terminology specific to the ×86 microprocessor architecture (such as register names, signal nomenclature, addressing modes, pinout definition, etc.) is known to practitioners in the microprocessor field, as is the basic design and operation of such microprocessors and of computer systems based on them. In particular, in the context of this Detailed Description of the exemplary burst transfer scheme, those skilled in the art are familiar with the signaling protocols used on the conventional 486 burst mode bus by the microprocessor and system logic, including addressing, cache control, and burst mode transfers.

When used with a signal, the # symbol designates a signal that is active low, while the / symbol designates the complement of a signal.

Also, in the context of 486 computer system, the term "burst" technically refers to transfers initiated with a single address strobe followed by multiple BRDYs. A "cache line fill" refers to the transfer of multiple Dwords to load a cache line. Although bursting can occur in other circumstances, as used in the Specification and Claims, "burst" and "burst order" are used in the context of a cache line fill.

1. 486 Computer System

Figure 1A:
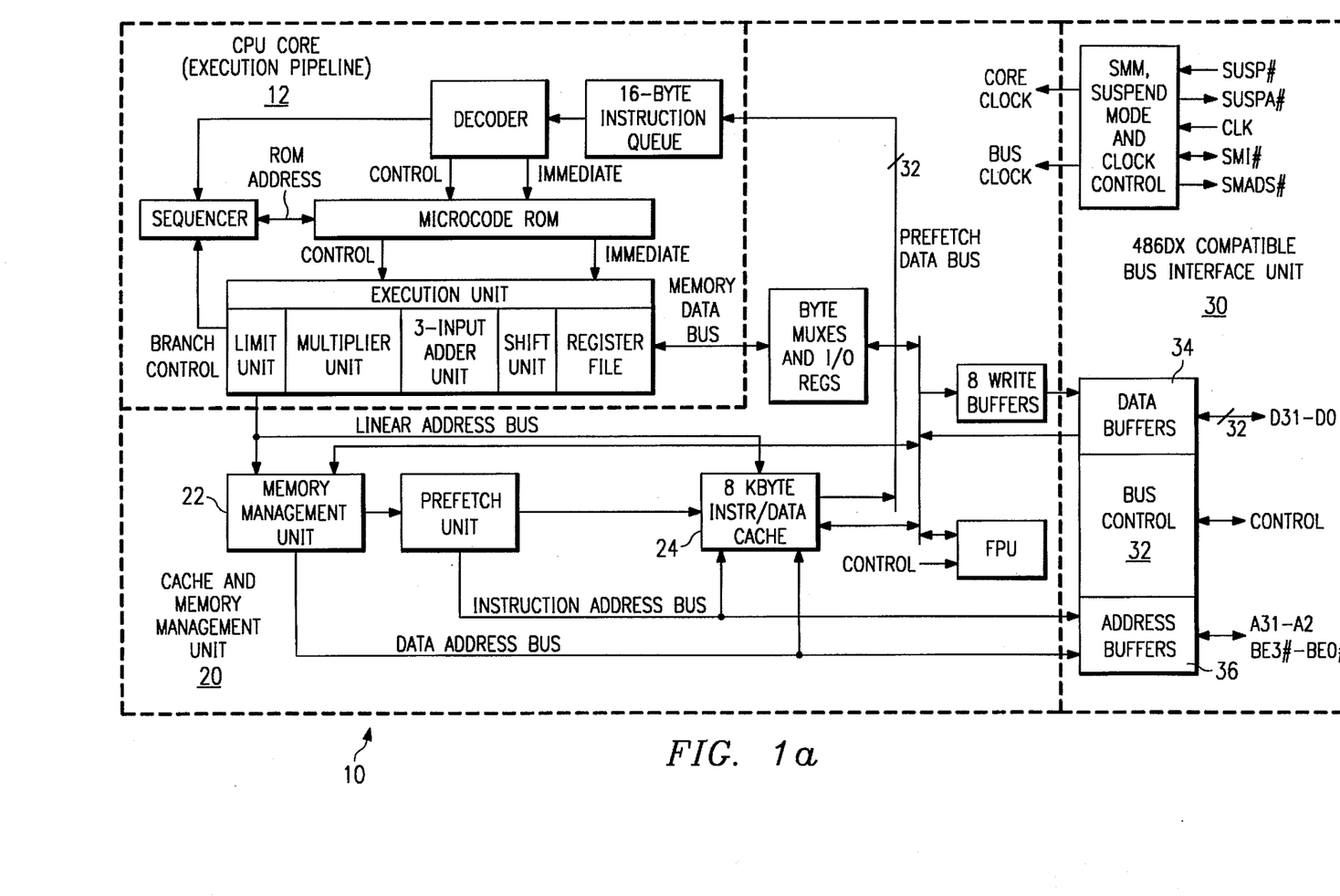
FIGS. 1a and 1b illustrate an exemplary (1a) 486-class microprocessor, and (1b) 486 computer system including microprocessor, memory subsystem, and system logic.

FIG. 1a illustrates an exemplary 486-class microprocessor. Microprocessor 10 includes an CPU core (execution pipeline) 12, a cache and memory management unit 20, and a bus interface unit 30.

The cache and memory management unit includes a memory management unit 22, prefetch unit 23, and a unified instruction/data cache 24. Memory management unit 22 generates addresses for instruction fetches and data reads/ writes, implementing conventional x86 segmentation and paging. Cache 24 receives access requests (instruction fetch and data read/write) from the CPU core 12 and the prefetch unit 23.

Cacheable instruction fetches and data reads/writes that miss in the cache 24 result in external bus cycles that cause the transfer of the requested addresses from a memory subsystem (see, FIG. 2) to the microprocessor 10, through bus interface unit 30. In particular, instruction fetches and cacheable reads that miss in the cache will cause a burst transfer of an entire 4 Dword cache line containing the requested address into the cache (operation for write misses depends upon write allocation policy).

The bus interface unit 30 includes bus control logic 32 and data and address buffers 34/36. The exemplary bus interface unit implements a conventional 486 bus interface, including bus cycle control signaling, and in particular cache control and burst transfer signaling.

Figure 1B:
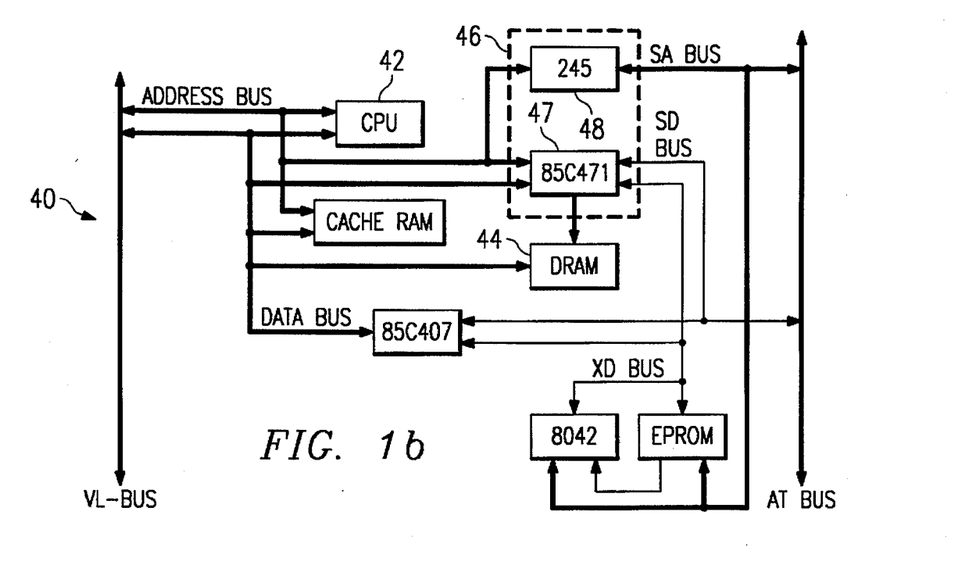

FIG. 1b illustrates an exemplary 486 computer system. The computer system 40 includes a microprocessor 42, memory subsystem 44, and system logic 46. The system logic 46 includes a DRAM and L2 cache controller 47 and I/O interface logic 48.

1.1 486 Bus Interface

Figure 2:
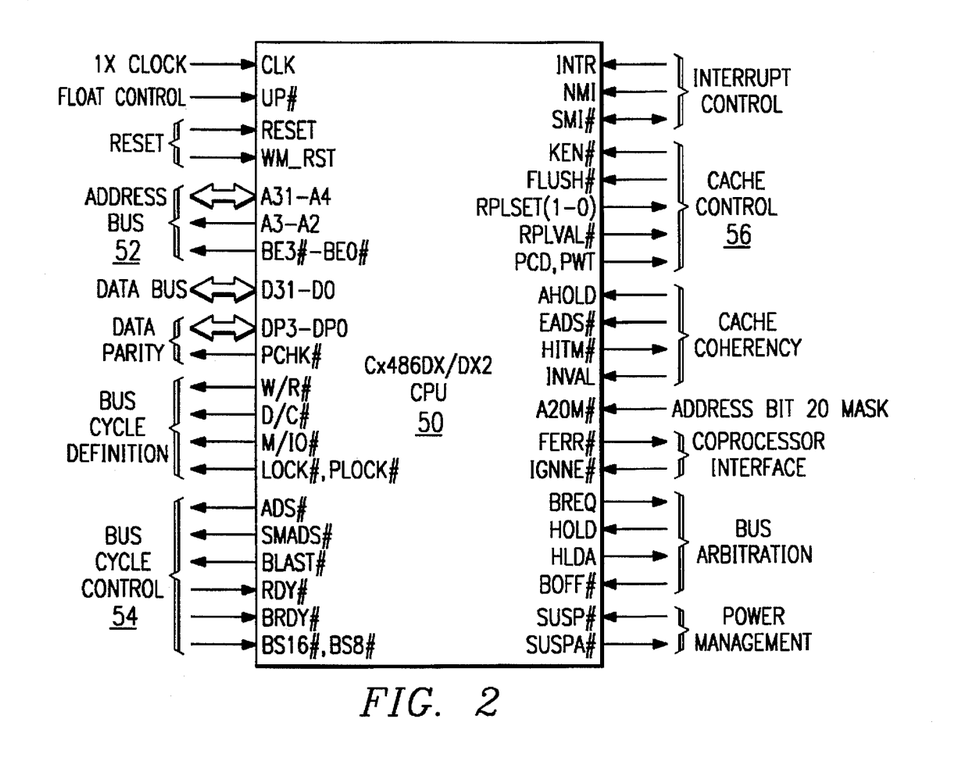
FIG. 2 illustrates the functional I/O signal groupings for the 486 microprocessor bus interface, including signaling for burst transfers over a 486 system bus.

FIG. 2 illustrates the functional I/O signal groupings for the exemplary 486-class bus interface. These functional groupings do not correspond to the precise 486 pinout arrangement for the I/O signals shown, but rather groups the I/O signals according to function.

The address bus signals 52 include address bits A<3:2> used to identify the requested Dword of a memory aligned 4 Dword block. The byte enables BE3#-BE0# are used to specify bytes within a Dword.

Bus cycle control signals 54 include the address strobe ADS# output from the microprocessor, and the ready signals RDY# and BRDY# (burst ready) that define a bus cycle. In particular, BRDY# is driven by the system logic to indicate the end of a current transfer within a burst cycle—the microprocessor samples BRDY# in the second and subsequent is clocks of a burst transfer (BRDY# rather than RDY# must be returned for each transfer except the final transfer of a burst, or the burst is aborted).

1.2. Burst Transfer Signals

Referring to FIG. 2, cache control signals 56 are used in controlling the microprocessor's internal cache (24 in FIG. 1a), including the cacheability of data transferred to the microprocessor and the corresponding identification of a bus cycle as burst or non-burst. The signals of particular interest are cache enable (KEN#) and page cache disable (PCD).

KEN# is an input from the system logic used to indicate that data being returned during the current cycle is cacheable—KEN# is sampled by the microprocessor (a) during the bus cycle transfer of a requested address to determine if the system logic considers the requested s address to be cacheable, such that, absent a noncacheability indication from the microprocessor, the system logic will attempt to transform the bus cycle to a burst transfer of the associated cache line, and (b) during the last transfer of a burst to confirm that the system logic has determined that the burst transfer should result in a cache line fill (i.e., that the requested address should be cached). When the microprocessor performs a cacheable code fetch or memory data read cycle, and KEN# is sampled active one clock before the first BRDY# (burst ready—see, Section 1.2) or RDY#, the bus cycle is transformed into a burst transfer of a 4 Dword (16 byte) cache line. To complete a burst transfer, the system logic asserts KEN# active one clock before the last read of the burst, thereby causing the cache line received into the cache fill buffer during the burst transfer to be written into the cache.

Deasserting KEN# during the bus cycle in which the requested address is transferred identifies the requested address as non-cacheable, and notifies the microprocessor that transfer will be a single bus cycle and not a burst transfer. Examples of bus cycle requests that are not cached are: I/O accesses, LOCKed reads, system management memory accesses, and interrupt acknowledge cycles.

PCD reflects the state of the PCD page attribute bit in the page table entry or the page directory entry. PCD signaling provides a mechanism for the operating system to control cacheability (such as to support video graphics hardware). For bus cycles in which the operating system desires to disable page cacheability, or in which paging is disabled, PCD is asserted. In response to the assertion of PCD, the system logic will not effect a burst transfer of the associated cache line, but nevertheless will return KEN# if a decode of the requested address indicates that from the viewpoint of the system logic the requested address is cacheable.

PCD is used for a novel, non-standard function in the exemplary implementation of the burst transfer system (see, Section 2).

2. Ascending Only Burst Transfers

For the exemplary burst transfer system, an ascending only burst ordering according to one aspect of the invention is used. Implementing a descending only burst ordering according to another aspect of the invention is analogous.

From the Background, the conventional 486 burst order is given in Table 1, reproduced below:

TABLE 1

| A<3:2> | A<2> | Burst Order | Burst Direction |
| --- | --- | --- | --- |
| 0 | 0 | 0-1-2-3 | Ascending |
| 1 | 1 | 1-0-3-2 | Descending |
| 2 | 0 | 2-3-0-1 | Ascending |
| 3 | 1 | 3-2-1-0 | Descending |

Using the 486 burst orders for requested addresses A<3:2>0 and 2 results in ascending orders, and maintains compatibility with 486 computer systems that assume a conventional 486 burst ordering. As described in the Background, using these same ascending burst order for requested addresses A<3:2>1 and 3, while technically compatible, may for some 486 computer systems result in performance degradation or memory corruption.

Specifically, using the ascending orders 0-1-2-3 for the requested address A<3:2>1 and the ascending order 2-3-0-1 for the requested address A<3:2>3 means that the requested address (critical Dword) would not be the first Dword received by in the transfer. For these requested addresses, the burst ordering scheme according to one aspect of the invention is to: (a) first run a single non-burst bus cycle to retrieve a requested address A<3:2>1 or 3, followed immediately by a corresponding ascending burst transfer 0-1-2-3 or 2-3-0-1.

This burst ordering scheme can be referred to as 1+0-1-2-3 or 1+2-3-0-1, or in general as 1+4.

The ascending only burst ordering scheme is summarized in Table 2.

TABLE 2

| A<3:2> | A<2> | Burst Order | Burst Direction |
| --- | --- | --- | --- |
| 0 | 0 | 0-1-2-3 | Ascending |
| 1 | 1 | 1 + 0-1-2-3 | Ascending |
| 2 | 0 | 2-3-0-1 | Ascending |
| 3 | 1 | 3 + 2-3-0-1 | Ascending |

To avoid confusing the system logic by the use of an initial non-burst bus cycle followed by a burst transfer, the PCD pin is driven high during the non-burst cycle (1+), indicating a noncacheable cycle. If the KEN# pin is sampled asserted during this non-burst bus cycle (indicating that, from the point of view of the system logic, the requested address is cacheable), the microprocessor follows the single cycle with a burst read generated from the requested address but with A<2> set equal to 0. From Table 2, this scheme results in the burst read being initiated with an initial address of either A<3:2>1 or 3 (depending on the selected state of A<3>), resulting in an ascending only burst transfer (+0-1-2-3 or +2-3-0-1).

In accordance with conventional 486 bus operation, the A<3:2>1 or 3 burst transfer (+4) following a non-burst bus cycle (1+) is converted to a single bus cycle if KEN# is sampled inactive with first (B)RDY#. Further, in accordance with the preferred embodiment, the A<3:2>1 or 3 burst transfer is performed only if KEN# is sampled active during the non-burst (1+) bus cycle.

Thus, using the ascending only burst ordering scheme according to this aspect of the invention ensures compatibility with 486 computer systems (including those designed to expect conventional 486 burst ordering) while avoiding any significant performance degradation or memory corruption associated with initiating a burst transfer with other than the requested address (critical Dword).

2.1. Burst Ordering Logic

Figure 3:
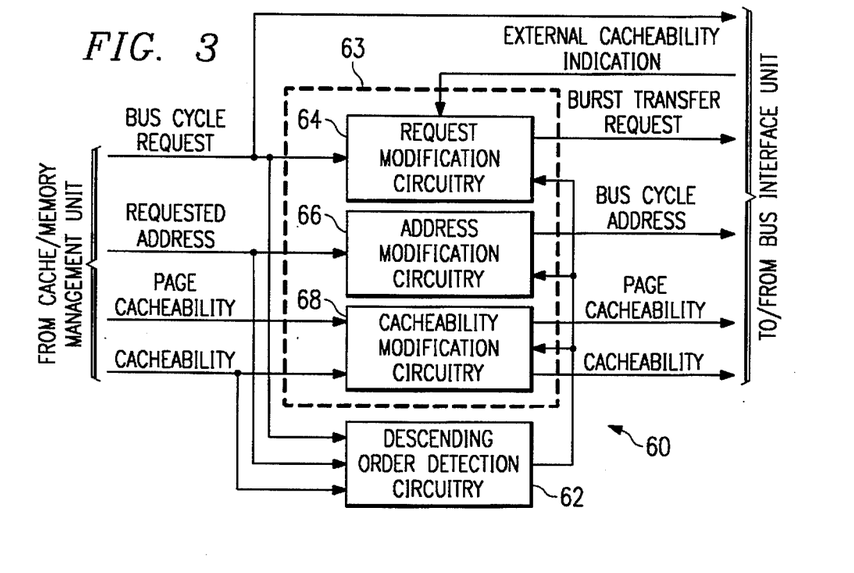
FIG. 3 illustrates burst ordering logic that implements an ascending (descending) only burst ordering according to one aspect of the invention.

FIG. 3 illustrates burst ordering logic that implements an ascending only burst ordering according to one aspect of the invention. Referring to FIG. 1a, for the exemplary embodiment, the burst ordering logic 60 is included as part of the bus control circuitry 32 in the bus interface unit 30.

The burst ordering logic 60 includes descending order detection circuitry 62 and modification circuitry 63. The modification circuitry includes request modification circuitry 64, address modification circuitry 66 and cacheability modification circuitry 68.

Referring to FIGS. 1a and 3, the burst ordering logic 60 receives the following signals from the cache/memory management unit 20: (a) Bus Cycle Request (Read Miss), (b) Requested Address, (c) Page Cacheability, and (d) Cacheability. In addition, the burst ordering logic receives an External Cacheability Indication from the bus control logic 30.

The Bus Cycle Request signal is generated in response to a read miss which would normally initiate a bus cycle to retrieve the Requested Address (which the system logic may is service as a burst transfer).

The Page Cacheability signal controls PCD signaling—Page Cacheability from the memory management unit 22 is active if the page attribute bit indicates that the page containing the Requested Address is cacheable.

The Cacheability signal is a used internally by the memory management unit 20 and bus control logic 32 to define cacheability of a requested address from the viewpoint of the microprocessor. The Cacheability signal is derived from internal and external events that define whether a Requested Address is cacheable—noncacheable events include accesses where the PCD attribute bit indicates the associated page is noncacheable, LOCKed read cycles, and I/O accesses. Thus, if PCD will be asserted for a Requested Address, the Cacheability signal will be inactive, likewise indicating that the Requested Address is noncacheable.

The External Cacheability Indication is derived from the KEN# and RDY# signals provided to the bus control logic by the system logic. This signal identifies to the burst ordering logic 60 whether KEN# was sampled active at the appropriate time during a bus cycle request.

The descending order detection circuitry 62 receives from the cache/memory management unit 20 the Bus Cycle Request, Requested Address, and Cacheability signals. In response to these signals, the descending order detection circuitry provides control signals to the circuit modules in modification circuitry 63: request modification circuitry 64, address modification circuitry 66, and cacheability modification circuitry 68.

The modification circuitry 63 provides the following outputs to the bus control logic 32: Burst Transfer Request, Bus Cycle Address Request, Page Cacheability, and Cacheability. The Burst Transfer Request from the Request Modification Circuitry 64 is used to request a burst transfer (+4) following a non-burst transfer (1+) of a Requested Address in accordance with the 1+4 burst ordering technique of the invention. The Bus Cycle Address from the Address Modification Circuitry 66 is either the Requested Address (pass through) or a modified Requested Address used to initiate an associated +4 burst transfer (to retrieve the cache line containing the Requested Address). The Page Cacheability and Cacheability signals are generated by the Cacheability Modification Circuitry 68 to implement the 1+4 burst ordering technique of the invention.

Referring to FIGS. 1a and 3 and Table 2, each bus cycle request from the memory management unit 22 is monitored by the descending order detection circuitry 62 to determine which Dword of a cache line is being requested, i.e., the state of the address bits A<3:2>.

If the address request is A<3:2>0 or 2, designating an ascending order burst, the corresponding bus cycle information—Requested Address, Page Cacheability, and Cacheability—are passed through without modification. Specifically, the Burst Transfer Request signal will be inactive and the Bus Cycle Address will correspond to the Requested Address (pass through)—both Page Cacheability and Cacheability will be active indicating cacheability.

In response, the bus control logic 32 initiates a bus cycle by driving out the Requested Address (with PCD inactive). If the address request is cacheable, the system logic will assert KEN# and return BRDY# when the address request is ready, beginning a burst transfer of the cache line (0-1-2-3 or 2-3-0-1).

2.2. Burst Modification

Referring to FIGS. 1a and 3 and Table 2, if the Requested Address includes A<3:2> equal to 1 or 3, then it could produce a descending order burst transfer (if the system logic determines that the Requested Address is cacheable). In this case, the burst ordering logic 60 modifies the request in accordance with the burst ordering technique of the invention, as exemplified in Table 2.

The descending order detection circuitry 62 detects the A<3:2>1 or 3 condition, and signals the modification circuitry 63. In response, the cacheability modification circuitry 68 modifies Page Cacheability and Cacheability to be inactive, indicating that the Requested Address is noncacheable (assuming that the Page Cacheability and Cacheability signals from the cache/memory management unit 20 were active indicating cacheable). In response, the bus control logic asserts PCD to convert the current bus cycle for the Requested Address to a single (1+) non-cacheable, non-burst cycle—the Bus Cycle Address from the address modification circuitry 66 corresponds to the Requested Address.

Modification circuitry 63—request modification circuitry 64 and address modification circuitry 66—detects when the descending order detection circuitry 62 has forced a non-cacheable, non-burst bus cycle to transfer the Requested Address. If the request modification circuitry then receives an External Cacheability Indication from the bus control logic indicating that KEN# has been samples active at the appropriate time during the now non-cacheable, non-burst (1+) bus cycle, it signals a Burst Transfer Request to the bus control logic to initiate a (+4) ascending-order burst transfer of the corresponding cache line.

At the same time, the address modification circuitry 64 generates a modified Bus Cycle Address to initiate the +4 ascending order burst transfer. Specifically, the modified Bus Cycle Address is the original Requested Address with A<2> cleared—for the preferred embodiment, A<3> is passed through, although any algorithm could be used to select a desired start point for an ascending order. Thus, the modified Bus Cycle Address references a location within the same cache line as the original Requested Address.

Page Cacheability and Cacheability are active during this ascending order burst cycle (indicating cacheability).

Figure 4A:
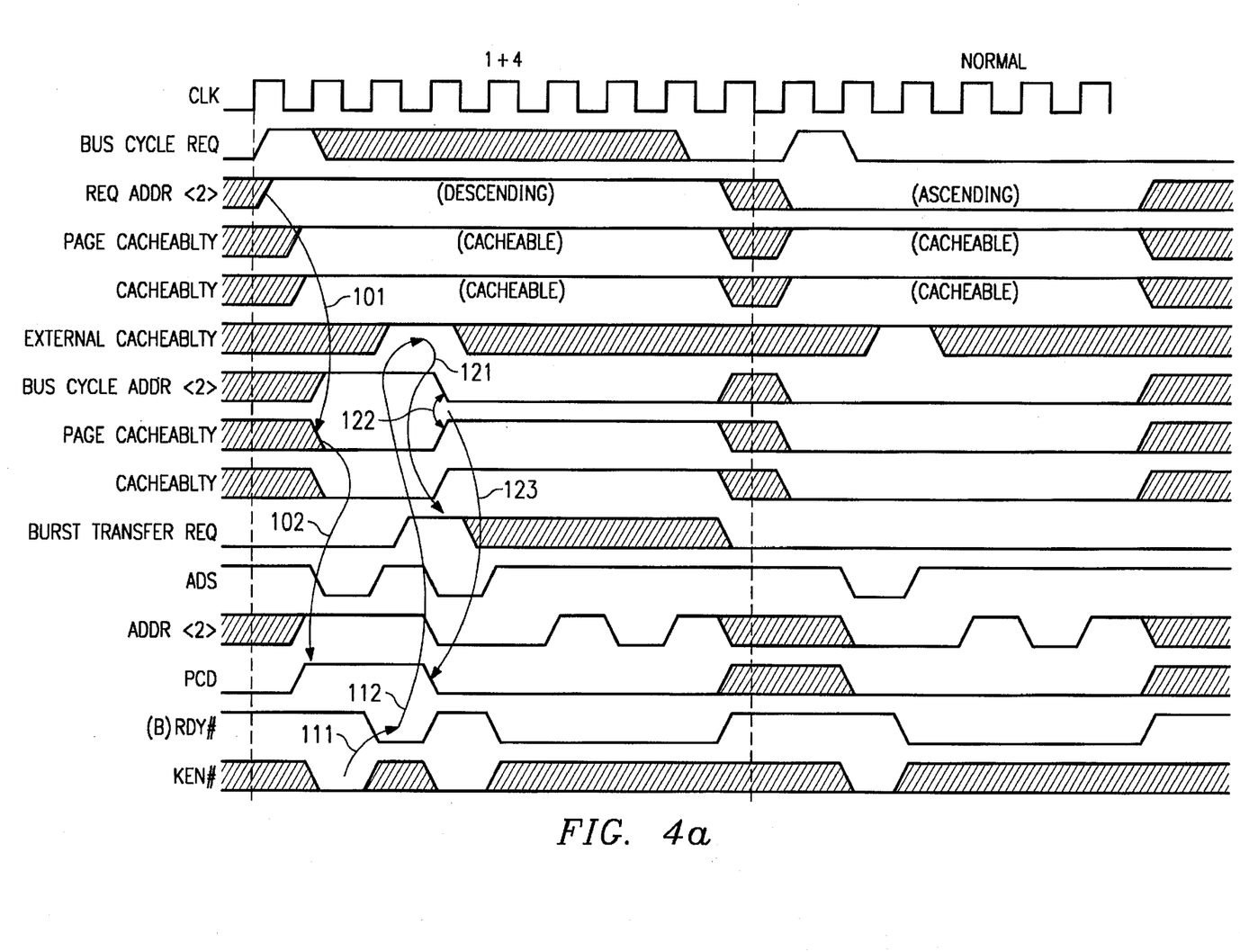
FIGS. 4a and 4b are a timing diagrams illustrating exemplary bus signals associated with the burst ordering technique of the invention.
Figure 4B:
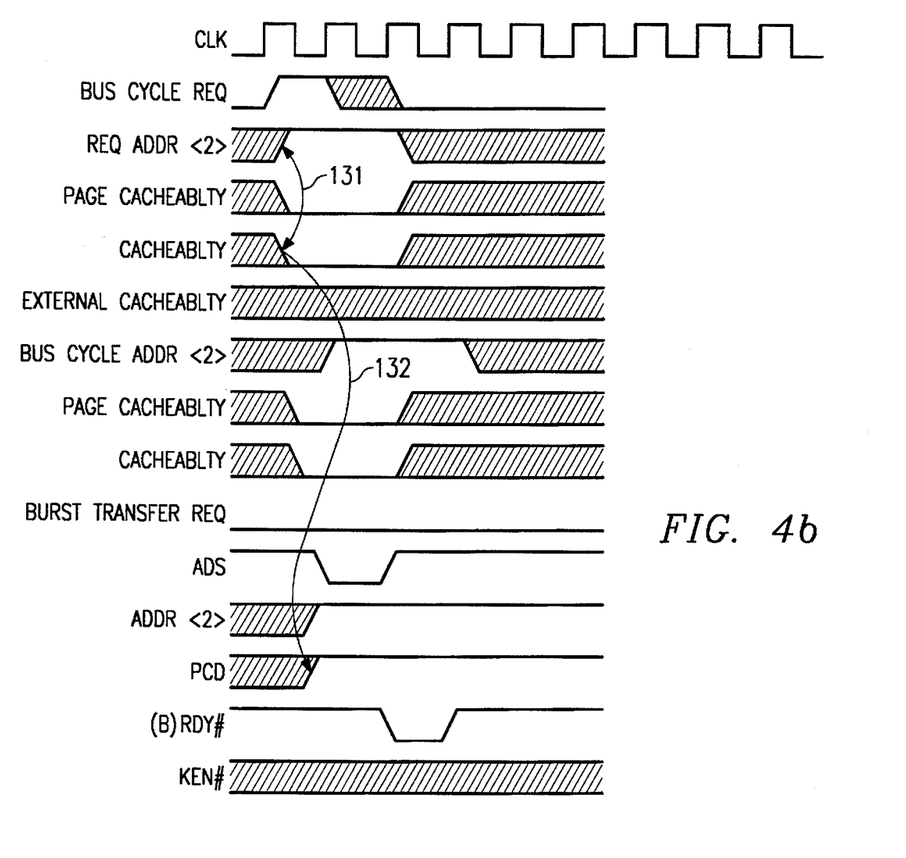

FIG. 4a is a timing diagram illustrating the bus activity (and internal signaling) generated by the microprocessor during both a 1+4 and a normal burst transfer. FIG. 4b is a timing diagram illustrating signaling where the Requested Address would produce a descending burst order, but Page Cacheability is inactive indicating that the Requested Address is not cacheable.

Referring to FIG. 4a, microprocessor signaling is indicated for both a 1+4 burst transfer (A<3:2>1 or 3) according to the invention, and a normal burst transfer (A<3:2>0 or 2).

A 1+4 burst transfer is initiated when the burst ordering logic (60 in FIG. 3) detects a Requested Address that could produce a descending burst order. Specifically, page cacheability (and cacheability) are switched inactive (101), causing the microprocessor to assert PCD (102), signaling to the system logic that the Requested Address is noncacheable. As a result, the system logic will transfer the requested address in a non-burst (1+) transfer.

If the system logic returns KEN# at the appropriate time (111 and 112), such that the External Cacheability input to the burst ordering logic indicates that the Requested Address is cacheable, the burst ordering logic will initiate a (+4) burst transfer (ascending order) to retrieve the associated cache line in accordance with the invention.

Specifically, the burst ordering logic signals a Burst Transfer Request (121). In addition, the Requested Address is modified (122) to provide a corresponding Bus Cycle Address (with A<2> cleared) and Page Cacheability (and Cacheability) is switched active (122) to indicate that the Bus Cycle Address is cacheable. As a result, the Bus Cycle Address will be driven out with PCD &asserted (123), causing the system logic to transform the bus cycle into a burst transfer of the associated cache line.

Referring to FIG. 4b, if the burst ordering logic detects that a Requested Address will produce a descending burst order, but that Cacheability is inactive (131), indicating that the Requested Address is noncacheable, then the burst ordering logic assumes a pass through condition. A normal bus cycle will result, with PCD asserted (132), causing the system logic to perform a non-burst transfer of the Requested Address.

3. Conclusion

Although the Detailed Description of the invention has been directed to certain exemplary embodiments, various modifications of these embodiments, as well as alternative embodiments, will be suggested to those skilled in the art. In particular, as noted above, while the exemplary embodiment implements a 1+4 burst transfer with ascending burst orders only, implementing the burst ordering technique of the invention with descending burst ordering is analogous.

For example, specific register structures, mappings, bit assignments, and other implementation details are set forth solely for purposes of providing a detailed description of the invention. Various modifications based on trade-offs between hardware and software logic will be apparent to those skilled in the art. Also, references to dividing data into bytes, words, double words (Dwords), quad words (Qwords), etc., when used in the claims, are not intended to be limiting as to the size, but rather, are intended to mean blocks of data.

The invention encompasses any modifications or alternative embodiments that fall within the scope of the Claims.

We claim:

1. In a computer system including a processor in which the processor generates address requests to retrieve associated doublewords (Dwords) from an internal cache, or if a requested address misses in the cache, from a memory subsystem, where the computer system transfers the Dword associated with the requested address from a memory subsystem by performing a burst transfer of a corresponding cache line of at least four Dwords stored in successive Dword positions in the cache line including the requested Dword which can be in any Dword position, and where the computer system is configured to perform burst transfers using an ascending burst order if the requested address is of a first type of address, and a descending burst order if the requested address is of a second type of address, depending on the Dword position of the requested Dword, a burst ordering system that implements burst transfers using a selected burst order only, either ascending only or descending only, comprising:

(a) burst ordering circuitry including burst order detection circuitry, cacheability circuitry, and address generation circuitry;

(b) for each cacheable requested address, the burst order detection circuitry detects whether the requested address is of a selected type, where the selected type is either the first type or the second type, such that the corresponding burst transfer would be in the selected burst order;

(c) in response to the detection of a requested address of other than the selected type, the cacheability circuitry causes a non-cacheability signal to be asserted to the memory subsystem along with the requested address, such that the memory subsystem does not effect a burst transfer in response to the requested address, but rather, performs a non-burst transfer of a requested Dword which is associated with the requested address;

(d) in response to the detection of a requested address of other than the selected type, and the resulting non-burst transfer of the requested Dword, the address generation circuitry causes to be generated a cache-line-transfer address of the selected type which is in a cache line that also includes the requested address, such that the memory subsystem effects a burst transfer of that cache line including the requested Dword previously transferred.

2. The burst ordering system of claim 1, wherein a cache line contains four Dwords in Dword positions 0-1-2-3, such that ascending burst orders are Dword positions 0-1-2-3 and Dword positions 2-3-0-1, and descending burst orders are Dword positions 1-0-3-2 and Dword positions 3-2-1-0.

3. In a 486 computer system including a 486-class microprocessor in which the processor generates address requests to retrieve associated doublewords (Dwords) from an internal cache, or if a requested address misses in the cache, from a memory subsystem, where the computer system transfers the Dword associated with the requested address from a memory subsystem by performing a burst transfer of a corresponding cache line of four Dwords designated (0-1-2-3) corresponding to Dword positions (0-1-2-3) of the cache line, including the requested Dword which can be in any Dword position, and where the computer system is configured to perform burst transfers using an ascending burst order of Dwords (0-1-2-3 or 2-3-0-1) if the requested address is of a first type with the requested Dword being (0 or 2), and a descending burst order Dwords (1-0-3-2 or 3-2-1-0) if the requested address is of a second type with the requested Dword being (1 or 3), depending on the Dword position (0, 1, 2, or 3) within an associated cache line of the requested Dword, a burst ordering system that implements burst transfers using a selected burst order only, either ascending only or descending only, comprising:

(a) burst order detection means for detecting, for each cacheable requested address, whether the requested address is of a selected type, where the selected type is either the first type or the second type, such that the corresponding burst transfer would be in the selected burst order;

(b) cacheability means for causing, in response to the detection of a requested address of other than the selected type, a non-cacheability signal to be asserted to the memory subsystem along with the requested address, such that the memory subsystem does not effect a burst transfer in response to the requested address, but rather, performs a non-burst transfer of a requested Dword which is associated with the requested address; and (d) address generation means for causing to be generated, in response to the detection of the requested address of other than the selected type, and the resulting non-burst transfer of the requested Dword, a cache-line-transfer address of the selected type which is in a cache line that also includes the requested address, such that the memory subsystem effects a burst transfer of that cache line including the requested Dword previously transferred.

4. The burst ordering system of claim 3, wherein the 486 computer system supports page cache disable (PCD) signaling using a PCD signal by which the 486-class microprocessor designates a requested address as non-cacheable such that the memory subsystem does not effect a burst transfer, and wherein the noncacheability signal asserted by the cacheability means is the PCD signal.

5. A method of burst ordering using a selected burst order only, either ascending only or descending only, implemented in a computer system including a processor in which the processor generates address requests to retrieve associated doublewords (Dwords) from an internal cache, or if a requested address misses in the cache, from a memory subsystem, where the computer system transfers the Dword associated with the requested address from a memory subsystem by performing a burst transfer of a corresponding cache line of at least four Dwords stored in successive Dword positions in the cache line, including the requested Dword which can be in an), Dword position, and where the computer system is configured to perform burst transfers using an ascending burst order if the requested address is of a first type of address, and a descending burst order if the requested address is of a second type of address, depending on the Dword position of the requested Dword, comprising the steps:

(a) detecting, for each cacheable requested address, whether the requested address is of a selected type, where the selected type is either the first type or the second type, such that the corresponding burst transfer would be in the selected burst order;

(b) in response to the detection of a requested address of other than the selected type, asserting a noncacheability signal to the memory subsystem along with the requested address, such that the memory subsystem does not effect a burst transfer in response to the requested address, but rather, performs a non-burst transfer of a requested Dword which is associated with the requested address;

(c) in response to the detection of a requested address of other than the selected type, and the resulting non-burst transfer of the requested Dword, generating a cache-line-transfer address of the selected type which is in a cache line that also includes the requested address, such that the memory subsystem effects a burst transfer of that cache line including the requested Dword previously transferred.

6. The burst ordering method of claim 5, wherein a cache line contains four Dwords in Dword positions 0-1-2-3, such that ascending burst orders are Dword positions 0-1-2-3 and Dword positions 2-3-0-1, and descending burst orders are Dword positions 1-0-3-2 and Dword positions 3-2-1-0.

* * * * *